(12) United States Patent
Triantafillos et al.

(10) Patent No.: US 11,411,980 B2
(45) Date of Patent: Aug. 9, 2022

(54) INSIDER THREAT MANAGEMENT

(71) Applicant: Defend Edge, Lombard, IL (US)

(72) Inventors: Anastasios Triantafillos, Addison, IL (US); Wasif Noor, Schaumburg, IL (US)

(73) Assignee: DEFENDEDGE AI CYBER TECHNOLOGIES LLC, Rosemont, IL (US)

( * ) Notice: Subject to any disclaimer, the term of this patent is extended or adjusted under 35 U.S.C. 154(b) by 0 days.

(21) Appl. No.: 17/013,068

(22) Filed: Sep. 4, 2020

(65) Prior Publication Data

US 2021/0084063 A1   Mar. 18, 2021

Related U.S. Application Data

(60) Provisional application No. 62/941,977, filed on Nov. 29, 2019, provisional application No. 62/900,253, filed on Sep. 13, 2019.

(51) Int. Cl.
*H04L 9/40* (2022.01)
*G06F 16/951* (2019.01)
*H04L 67/50* (2022.01)

(52) U.S. Cl.
CPC ........ *H04L 63/1433* (2013.01); *G06F 16/951* (2019.01); *H04L 63/1425* (2013.01); *H04L 67/22* (2013.01)

(58) Field of Classification Search
CPC . H04L 63/1433; H04L 63/1425; H04L 67/22; G06F 16/951
See application file for complete search history.

(56) References Cited

U.S. PATENT DOCUMENTS

| | | | |
|---|---|---|---|
| 11,030,562 B1 * | 6/2021 | Dean | G06F 21/577 |
| 2015/0310195 A1 * | 10/2015 | Bailor | G06F 21/45 726/6 |
| 2018/0255084 A1 * | 9/2018 | Kotinas | G06K 9/6218 |
| 2019/0379699 A1 * | 12/2019 | Katragadda | G06N 3/006 |
| 2020/0089848 A1 * | 3/2020 | Abdelaziz | G06N 20/00 |
| 2020/0145447 A1 * | 5/2020 | Coffey | H04L 63/1425 |
| 2020/0177614 A1 * | 6/2020 | Burns | H04L 63/20 |

* cited by examiner

*Primary Examiner* — Mohamed A. Wasel
*Assistant Examiner* — Rachel J Hackenberg
(74) *Attorney, Agent, or Firm* — Rothwell, Figg, Ernst & Manbeck, P.C.

(57) ABSTRACT

A method is provided. The method includes receiving information about user data and user behavior relating to a user, where the information is derived at least in part from a human resources database. The method includes applying analytics to the received information. The method includes, as a result of applying analytics to the received information, generating a threat score for the user.

13 Claims, 8 Drawing Sheets

| Events | | Risk Score | Confidence |
|---|---|---|---|
| Home | 12am-4am | 10 | 99 |
| Commute | 4am-8am | 10 | 30 |
| Work | 8am-12pm / 1pm-5pm | 50 | 99 |
| Lunch | 12pm-1pm | 25 | 50 |
| Personal | 5pm-6pm | 25 | 50 |
| Life | 6pm-12am | 10 | 99 |
| HR | Evaluation | 50 | 99 |
| Firewall | Baseline | 25 | 50 |
| AD | Active sessions | 25 | 50 |
| ? | Variable | 10 | 99 |
| ? | Variable | 10 | 99 |
| Risk score:
10%-30% Low
30%-59% Medium
60%-100% High | | 21.6 | 71% |

FIG. 5

INSIDER THREAT MANAGEMENT

CROSS-REFERENCE TO RELATED APPLICATIONS

This application claims priority to U.S. Ser. Nos. 62/900,253, filed on Sep. 13, 2019, and 62/941,977, filed on Nov. 29, 2019, the contents of which are incorporated herein by reference in their entireties.

TECHNICAL FIELD

The subject matter disclosed herein relates to, inter alia, certain software, hardware and artificial intelligence products and methods utilized in connection with insider threat management.

BACKGROUND

Information technology (IT) systems are critical components of businesses and other organizations. Such IT systems store sensitive information, including for example information that could be damaging if released outside the organization. Competitors may utilize sensitive information to gain an unfair advantage. Bad actors may utilize sensitive information for blackmail, identity theft, or other misdeeds. Organizations therefore seek to protect their IT systems, and do so through the use of various security measures, including e.g. use of passwords, encryption, information containment, and so forth.

The large majority of data breaches (perhaps as high as 95%) are caused by internal users. This includes both internal uses acting maliciously, as well as unintentionally. A somewhat smaller majority of security attacks (perhaps as high as 60%) are initiated by internal users. For instance, a user may cause a data breach or otherwise compromise the IT systems by clicking on a link in a phishing email (e.g. which may cause malware to be installed). A user may also cause a data breach or otherwise compromise the IT systems willfully, such as by transferring sensitive documents to a flash drive or other storage means that can be taken off premises.

It can take as long as six months for an organization to detect a data breach or other compromise of the IT systems. IT systems and the tools necessary for maintaining their security can also be complex and may overwhelm an organization whose primary purpose is not IT security. Such complexity can also contribute to threats posed by internal users and delay the discovery of breaches and other problems.

Existing systems to secure IT systems are imperfect.

SUMMARY

Embodiments provide solutions to, inter alia, the above-described problems.

Because internal users cause such as high percentage of data breaches, and their actions can vary from willful to unintentional, it is important to be able to predict when a breach is likely to occur and take preventative measures in advance. Embodiments help to achieve this prediction by assigning a threat score to each employee or other person associated with an organization. The score will help to assess that person's risk to the organization in terms of IT security and to allow the organization to manage the threat.

Embodiments disclosed herein base a threat score off of multiple sources of information, which permits a comprehensive view of a person's risk than would be possible with more limited sources of information. For example, embodiments may employ such sources as information from (1) a human resources database, (2) a directory service system (e.g., Windows® Active Directory), (3) an asset (e.g. document) management system (e.g., a source code repository such as Git), (4) an endpoint security system (e.g. for the actual protection of a workstation, laptop, smartphone, tablet, and so on, including systems such as F-Secure, McAfee, and Symantec Endpoint Protection), and (5) a firewall system. Embodiments may be configured to generate a threat score based on one or more of these sources of information, and may also employ additional sources of information. Embodiments base a threat score off of user data and user behavior, including how such user behavior changes over time.

Advantages of embodiments include expanded threat intelligence management capabilities, such as predicting and mitigating threats before a data breach or other IT security failure occurs. Embodiments may also be deployed in a wide variety of client systems and architectures, and have the flexibility to be deployed locally on site with the IT system (e.g. to offer more control) or in the cloud (e.g. to offer more convenience).

Embodiments described herein include an enterprise platform that integrates and analyzes multiple enterprise data sources and uses machine learning to execute rules and workflows based on end user behavior (whether permissible or not) defined by an organization's information security policy. Embodiments may effectively centralize four different roles: that of user and entity behavior analytics (UEBA); that of security incident and event management (STEM); that of identity and access management (IAM); and that of security orchestration, automation and response (SOAR). Embodiments are able to meet compliance requirements, which may differ by industry; may simplify IT operation and reduce costs; and effectively employ sophisticated machine learning and artificial intelligence capabilities.

According to a first aspect, a method is provided. The method includes receiving information about user data and user behavior relating to a user, wherein the information is derived at least in part from a human resources database. The method further includes applying analytics to the received information. The method further includes, as a result of applying analytics to the received information, generating a threat score for the user.

In some embodiments, the information is further derived at least in part from one or more of a directory service system, an asset management system, an endpoint security system, and a firewall system. In some embodiments, applying analytics comprises detecting that the user has deviated from a baseline behavior. In some embodiments, the method further includes detecting that the deviation from baseline behavior corresponds to an indicator from the human resources database indicating a life change event. In some embodiments, the method further includes taking a corrective action based on the threat score for the user, wherein the corrective action includes one or more of: publishing an alert, limiting privileges of the user, activating a monitoring agent to monitor the user, disabling network access for the user, and suspending an account of the user. In some embodiments, taking the corrective action is performed as a result of the threat score for the user exceeding a threshold. In some embodiments, the information is further derived at least in part from crawling a network including one or more of the Deep Web and the Dark Web.

According to a second aspect, a system is provided. The system includes a memory; and a processor. Said processor is configured to: receive information about user data and user behavior relating to a user, wherein the information is derived at least in part from a human resources database; apply analytics to the received information; and, as a result of applying analytics to the received information, generating a threat score for the user.

According to a third aspect, a computer program is provided comprising instructions which when executed by processing circuitry causes the processing circuitry to perform the method of any embodiment of the first aspect.

According to a fourth aspect, a carrier is provided containing the computer program of the third aspect, wherein the carrier is one of an electronic signal, an optical signal, a radio signal, and a computer readable storage medium.

BRIEF DESCRIPTION OF THE DRAWINGS

The accompanying drawings, which are incorporated herein and form part of the disclosure, help illustrate various aspects of the present invention and, together with the description, further serve to describe the invention to enable a person skilled in the pertinent art to make ans use the aspects disclosed herein. In the drawings, like reference numbers indicate identical or functionally similar elements.

FIG. 5 illustrates an example risk calculation relating to one or more aspects of an insider threat management system according to an embodiment of the present invention.

DETAILED DESCRIPTION

Figure 1:
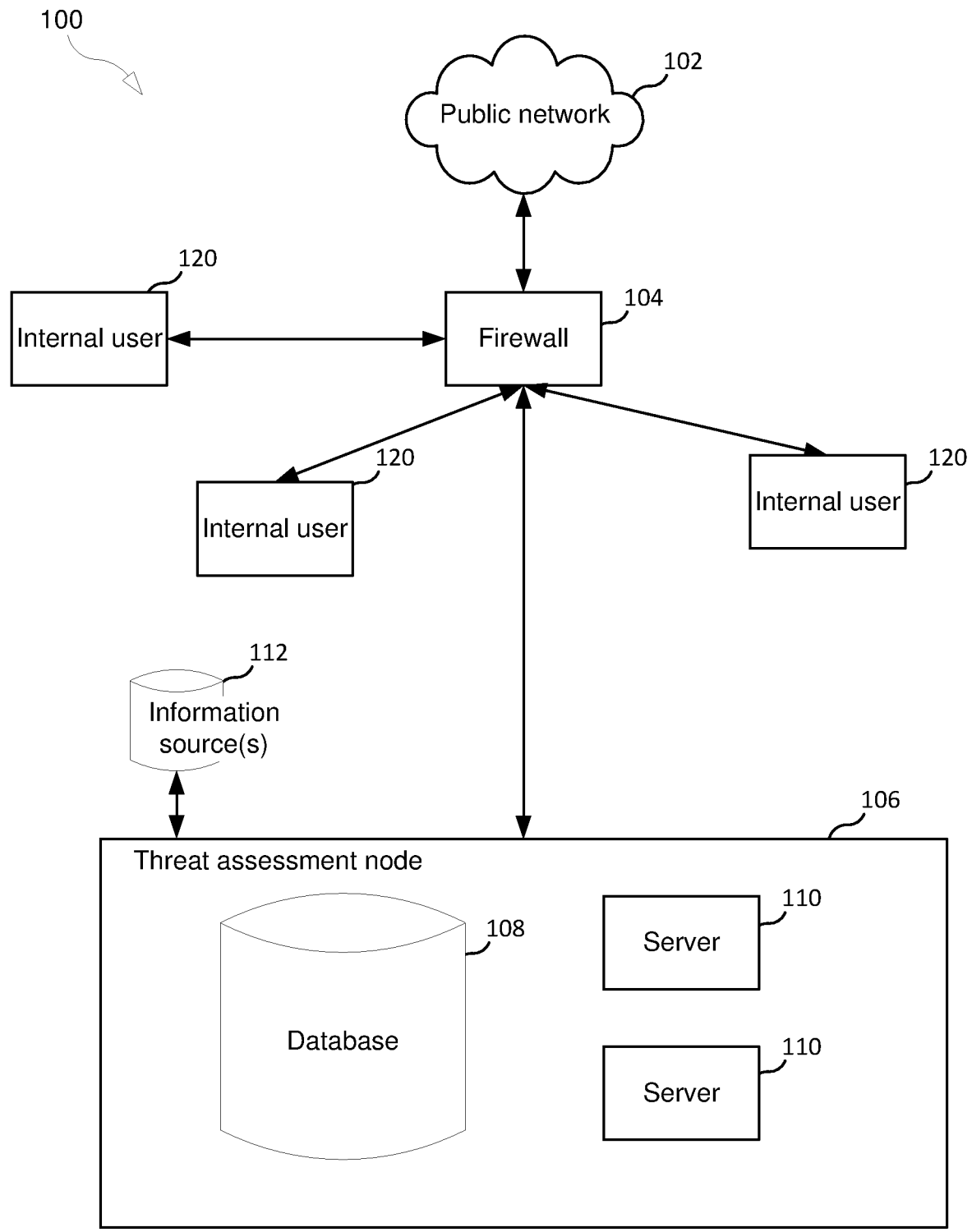
FIG. 1 illustrates one or more aspects of an insider threat management system according to an embodiment of the present invention.

Internal users of an IT system may cause harm to the IT system in a variety of ways. Consider the following examples:

User breach by email: An employee clicks on a link in an email and malicious code is downloaded providing a hacker a backdoor into the corporate network. As a result, a malicious actor spends time locating corporate digital assets, deploys cryptolocker ransomware, and demanding payment be made (e.g., in bitcoin).

User breach by stolen credentials: An employee uses a corporate password on an external website. The external website is breached by one or more malicious actor. These malicious Actors then gain access to the employee's credentials and therefore the corporate IT system that the employee uses. As a result, a malicious actor spends time locating corporate digital assets, deploys cryptolocker ransomware, and demanding payment be made (e.g., in bitcoin).

Malicious user, bad job review: Initially, an employee is hired and gets access to IT systems based on the employee's job role. Later, the employee receives a bad review, and becomes disgruntled. As a result, the employee decides to steal confidential data and attempts to sell confidential data to one or more competitors and/or leaves the company.

Malicious user, former employee or new role within company: Initially, an employee is hired and gets access to IT systems based on the employee's job role. Later, the employee transfers to a new job and notices that the employee can still access files related to the employee's former job. The employee may be at a new organization, or at a different role in the same organization. Either way, the employee is able to access files which the employee has no permission to access. If disgruntled or otherwise inclined to act maliciously, the employee could decide to steal confidential data and attempt to sell confidential data to one or more competitors.

As used herein, an "employee" can encompass users of an organization's IT system that are intended to have access to the IT system, or at one point in time were intended to have such access. The term, for example, includes contractors, temporary workers, and others who have been given permission to access the IT system.

As the examples above illustrate, there are many ways in which a user can unintentionally contribute to a compromised security situation. These can include, among other things, falling prey to phishing emails, misuse or mismanagement of passwords or other access tokens, unsafe download practices, and failing to properly encrypt sensitive documents or communications.

Additionally, there are many ways in which a user may intentionally compromise IT security. While it is not possible to predict with perfect accuracy who is going to intentionally compromise IT security, there are factors that can contribute to a person's risk or threat score. For example, certain events in a person's life (e.g., marital, career, family) can be a trigger for such behavior. Consider an employee going through a divorce or having financial or legal problems; such an employee may represent an increased risk to an organization. Further, there are many different rationales for why an employee may intentionally compromise IT security. These include, among other things, the employee being disloyal or disgruntled, or seeing him or herself as a saboteur, a moonlighter, a mole, or an activist. The employee may compromise IT security in various ways, including, among other things, inserting malicious code, installing keystroke loggers or network sniffers, or using removable media to store sensitive documents.

Some factors that may be considered in determining, for instance, whether an employee is an increased risk factor, may include the following. These factors may be used to detect the likelihood or possibility of future harmful actions. The factors include unused vacation, whether the employee is the first into the office and the first to leave, marital status change, whether a reduction in force (RIF) notification has been sent that applies to the employee, changes in document access, attempt to use movable storage devices, disgruntled behavior e.g. due to salary change or evaluation, disagreement or conflict with management, aggressive, unwarranted, or violent Behavior, inefficiency or lack of productivity, repeated time-offs, repeated tadiness, lying, odd work hours, and/or unusual travel.

Other factors include whether an employee remains in control, an employee's desire to control the employee's schedule, emotional stability, data and file transfers, document metadata, download of data and documents, downloading of hacker or other tools not job specific, egress of data to personal accounts and use of external items, human error and exposure of sensitive data, job hunting (which may further indicate a high risk of data exfiltration), mood change, financial stress, work related stress, poor performance review, voicing policy resistance, employee conflict, and/or a privilege escalation attempt or request.

Given all the ways that internal users can threaten the security of IT systems, it is important to assess the risk of an individual employee, and generate a threat score that captures that risk and allows it to be meaningfully managed.

FIG. 1 illustrates a system 100 according to an embodiment of the present invention. System 100 includes a public network 102, such as the Internet. Access to the public network 102 is mediated by a firewall 104, which monitors and controls incoming and outgoing traffic. Internal users 120 may connect to the public network 102 by going through firewall 104. System 100 also includes a threat assessment node 106. Threat assessment node 106 may include a database 108 and one or more servers 110 (e.g., which may include physical servers or virtual servers). Threat assessment node 106 may be communicatively coupled to the firewall 104 and one or more information sources 112 (e.g., a human resources database, a directory service system (e.g., Windows® Active Directory), an asset (e.g. document) management system (e.g., a source code repository such as Git), and an endpoint security system (e.g. a Virtual Private Network (VPN))). Such sources of information may be used by threat assessment node 106 to generate a threat score for individual internal users 120. The threat score may be generated according to any of the embodiments disclosed herein.

In some embodiments, each internal user 120 may have software (e.g. running in the background) that monitors the internal user 120 and sends reports back to threat assessment node 106. In some embodiments, such software may be always running, may be triggered upon specific conditions (e.g., a threat score being above a threshold, assigned by a supervisor or IT support staff), or may be randomly activated. Reports that are sent back to threat assessment node 106 may include, for example, system logs, security logs, and/or application logs. Such reports may also include a system snapshot at different time instances (e.g. periodically every ten minutes, two hours, etc.) indicating which processes are running, available system memory, CPU load, number of users on workstation, and so on. The threat assessment node 106 may utilize some or all of the information in these reports to help generate an internal user's 120 threat score.

In some embodiments, threat assessment node 106 may be physically located at an organization's site, for example close to other IT infrastructure. In other embodiments, threat assessment node 106 may be remote from the organization's site, for example it may be operated in a cloud environment. In some embodiments, each internal user 120 may communicate with the firewall 104 and/or public network 102 through the threat assessment node 106, such that the threat assessment node 106 is able to directly monitor network traffic. In other embodiments, threat assessment node 106 receives information (e.g., network traffic reports) from firewall 104, individual internal users 120, and/or one or more information sources 112.

Another example of an information source 112 may include manual information entry. A supervisor, HR employee, IT technical staff, or another appropriate person, may in some embodiments provide information manually about an employee. This may include providing the information through a user interface that is described herein. As an example, a supervisor may notice an employee's performance degrading and enter a note into the system to describe that event. As another example, an IT technical staff member may observe inappropriate behavior regarding IT resources and enter a note into the system to describe that behavior.

Receiving information from firewall 104, individual internal users 120, and/or one or more information sources 112 may involve translating the information from its original format to a format usable by threat assessment node 106. For instance, threat assessment node may ingest information from one or more of these sources, then store the information internally in a database, such as a database having a specific schema for storing the information in a format usable to the threat assessment node 106. This ingestion may include a number of different wrappers, the selection of which is based on the format of the original data. For example, there may be a first wrapper corresponding to a first format of an HR database and a second wrapper corresponding to a second format of another HR database. The first wrapper converts information in the first format into a format usable by threat assessment node 106; likewise, the second wrapper converts information in the second format into the format usable by threat assessment node 106. The ingestion may also include a custom Security Information Management (SIM) system, e.g. which provides long-term storage, analysis, manipulation, and reporting on logs and security records (such as firewall logs and/or AD logs).

As a further example of the ingestion of external information, such information may be in a structured format (e.g., such as a SQL database). The structure may assist in understanding the information, and translating it into a format usable by threat assessment node 106. Such information may be obtained by use of Application Programming Interfaces (APIs), whether public or private, that may be provided by the producers of such information. As an example, a given HR database vendor may provide a public API so that other programs may access specified information from the database. External information may also be in an unstructured format (e.g., syslogs, flat file format, email). Such information may need additional parsing in order to understand the information, and translate it into a format usable by threat assessment node 106.

Information source 112 may include any and all information and types of information that threat assessment node 106 may use to generate a threat score. Examples of such information follow, but embodiments disclosed herein are not limited to the specific types of information listed.

Information source 112 may include information from a human resources database. Examples of such information may include an employee's name, email, identification numbers, job title and department, employment history, and/or evaluation or job review history. For example, the human resources database may provide information about a HR performance review (such as when it was conducted, and status such as "succeeds [or meets or does not meet]

expectations") and/or a manager ranking (e.g., percentile or top/middle/low tier). The human resources database may also provide information about life changing events, such as a move (e.g., cross country or intra-city), martial updates (e.g., divorce), education (e.g., recent MBA degree), or termination.

Information source 112 may also include information gathered from other sources, such as public and/or private information about individuals, including those offered by third parties. Threat assessment node 106 may use such information as a validation data set, and may actively scan such information sources in order to detect in real-time or near real-time such information. As an example, LexisNexis provides a service for searching public records (e.g., bankruptcy records, criminal records, civil records, etc.). Threat assessment node 106 may make use of certain information learned through such sources. For example, if an employee (such as a deputy) has a personal legal issue or arrest incident (e.g. public battery) during the employee's time off, the system 100 may inform the employer (such as the county or municipality employing the deputy) about the incident. For example, system 100 may alert and notify supervisors or other relevant parties. This type of data (including criminal records and other legal issues) may be leveraged by threat assessment node 106 to determine if a user's threat score should be increased, such as if the user has had a change in life events or otherwise poses a risk to the user's employment status. Further examples of information that may be gathered from other sources such as public and/or private information include whether a user (or someone associated with a user) is going through a divorce or financial hardship. A person's behavior will be influenced by such events, and threat assessment node 106 may detect patterns over time e.g. in a user's HR record and/or external data sources such as those focused on logging human activity. Threat assessment node 106 may also use its own logs of past behavior and/or data to detect such patterns.

Information source 112 may include information from a directory service system (e.g., Windows® Active Directory). Examples of such information may include files accessed (e.g., read or written to), group permissions, and login history. Further examples may include end user identity entitlements, device information, hierarchy information, manager information, to include account information related but not limited to password management, changes, last login, user sessions, data access, server access, system access, and other system attributes and logs.

Information source 112 may include information from an asset (e.g. document) management system (e.g., Snipe-IT, ServiceNow, BMC Remedy, ITSM system of records for assets, or a source code repository such as Git). Examples of such information may include assets (e.g., documents) accessed (e.g., read or written to), assets checked out, and commit history. Additional information may also include information such as MAC Address, IP Address, Username, FirstName, LastName, DeviceName, Model Number, and other related data attributes required or helpful to identify physical and logical devices on a network.

Information source 112 may include information from an endpoint security system (e.g. F-Secure, McAfee, Symantic Endpoint Protection, and other endpoint security protection solutions). Such information may include number of viruses detected, last seen device, and definitions date (e.g., current or out of date). Additional information (some of which may be used for processing and/or correlation) may include Device Name, Username, IP Address, Last Connection by Host, Current Status of Definitions, Last Infection, Virus Name, including some other metadata specific to the device activity.

Information source 112 may include information from firewall 104 (e.g., Fortinet, Cisco, Palo Alto, SonicWall, Juniper, and other firewall systems, such as those that make syslogs or APIs available for system connection and data ingestion). Such information may include list of internet protocol (IP) addresses accessed, number of actions blocked, number of non-permitted URLs visited, total bandwidth usage, number of VPN connections, and number of authentication requests by an external IP address. Additional information may include capturing related user Internet and network traffic and sessions.

Information source 112 may include information received or derived from analyzing a network, such as the public Internet or a private intranet. A web crawler, for example, may be used to scan a network for information about an individual. The web crawler may be scanning the entire network, or a subset of the network that is determined to be particularly relevant for determining a threat score. For example, a web crawler may be instructed to scan social media sites. If an employee is posting confidential information on such sites, or posting information indicating a life change event, such information could be helpful when calculating a threat score. A web crawler may also be instructed to scan the so-called Deep Web and/or Dark Web. If an employee is offering confidential information for sale on the Dark Web, and identifying information (such as a nickname or otherwise) can tie the offer to the employee, such information could be helpful when calculating a threat score. Information about a sale of confidential information would also warrant an immediate response, such as an alert to a supervisor or appropriate person in order to verify and assess the situation.

In addition to passively scanning the network for such information, a web crawler may be instructed to perform specific searches to narrow down the scope of content to scan. Alternatively, or additionally, a web crawler may be instructed to use filters to limit the amount of material that it analyzes. For example, a crawler may search for terms related to particular employees (e.g., using identifying information, such as "first name," "last name," "username", "password," "company name," "social security number," or any combination of these). Likewise, a crawler may filter out pages that do not relate to a particular employee (e.g., using identifying information, such as "first name," "last name," "username", "password," "company name," "social security number," or any combination of these). Further examples of terms that may be used for searching and/or filtering results include business information (e.g., sensitive information, such as non-publically disclosed information, confidential and/or classified and/or restricted information, or intellectual property such as trade secrets). In some embodiments, if the crawler detects sensitive business information of this sort, e.g. publicly found on a domain such as web server, deep web server, or dark web server, then the location and contents of the page containing the sensitive business information is stored and the detection may also trigger a notification or alert to an appropriate party, and/or trigger remediation workflow process. Machine learning may be used to identify if particular content is related to or relevant to an employee. For example, a classifier may be trained to detect if a given web page relates to an employee, using information available from any other information source. When relevant content is identified, additional processing, including natural language processing, may be applied. For example, a first level of processing may be applied to determine whether an alert or other major response is appropriate (e.g., if an employee is suspected of disclosing confidential information), and a second level of processing may be applied to determine what impact the information may have on a threat score.

When crawling (e.g., the Dark Web or the Deep Web), the web crawler may use lists of known addresses to search, in addition to dynamically generating lists of addresses to search based on the ongoing search.

Threat assessment node 106 may use any of the information described above with respect to information source 112 when calculating a threat score.

Figure 2:
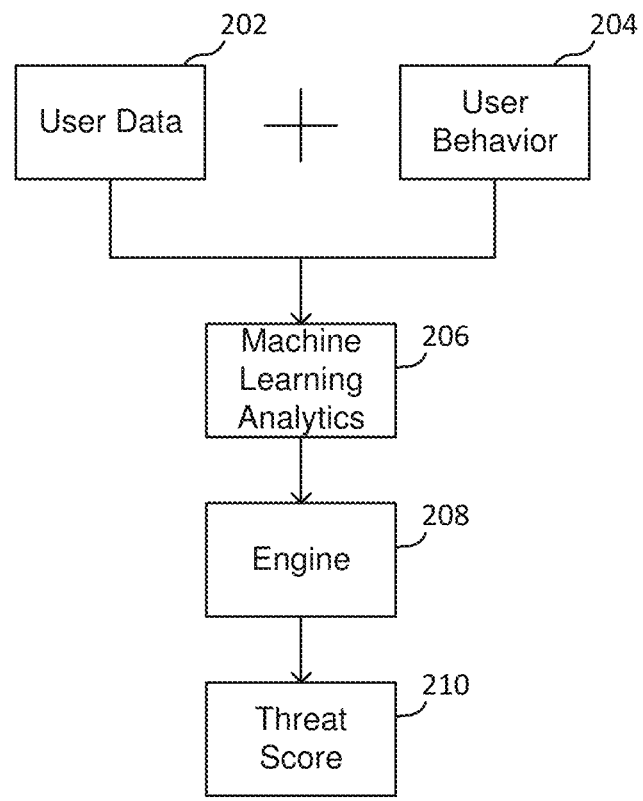
FIG. 2 illustrates a flow chart relating to one or more aspects of an insider threat management system according to an embodiment of the present invention.

FIG. 2 illustrates a flow diagram according to an embodiment. Information about user data 202 and user behavior 204 may be combined into analytics 206 (such as machine learning analytics). The results of this may then be fed into an engine 208, which generates a threat score 210. Each employee of an organization may be assigned an individual threat score, and the organization as a whole may be assigned an aggregate threat score based on the individual threat scores. For example, in one embodiment, the organizational threat score is the average of each of the individual threat scores. In other embodiments, the organization threat score may be the maximum individual threat score, or an average of the top n individual threat scores (where n may be static, e.g. n=5, n=10, or vary proportionally, e.g. as 5% of total employees).

In some embodiments, an organization threat score may be generated by the following equation: $\frac{1}{3}*100*((Inf/N_E)+(U/N_D)+(Iss/N_D))$, where Inf is the total number of infections (e.g., as reported by the endpoint security system), $N_E$ is the number of employees (e.g., as reported by the human resources database), U is the number of unknown devices (e.g., as reported by the firewall), $N_D$ is the number of devices (e.g., as reported by asset management system), and Iss is the number of issued devices (e.g., as reported by the endpoint security system). An organization threat score can be used in a number of ways. For example, the score may influence a company's ability to win a new contract, impact the price of a new cyber security insurance policy, or drive regulatory and compliance requirements or fines, or affect Merger & Acquisition activity. A Chief Information Security Officer, Compliance Officer, Executive, Director, or other appropriate person could consider an increase of an organization's organization threat score. For example, a company can adjust its information security strategy based on such scores. It is also possible, in embodiments, to determine who is responsible for contributing to an overall organization threat score. That is, if a company's Threat Score is X, but only Y % (e.g., 20%) of the organization is responsible for the majority of that score (e.g., owing to potential spam or spoofing, vendors using the company's internal network, etc.), a company may address security in a more targeted manner.

User data 202 may include information collected from firewall 104, individual internal users 120, and/or one or more information sources 112. Examples of user data 202 may include how recently internal user 120 received an evaluation and the contents of the evaluation; whether internal user 120 is in financial difficulty (e.g., collection activity related to gambling debts); the role internal user 120 has within the organization (e.g., senior scientist, IT support staff, CEO); and so on.

User behavior 204 may include information collected from firewall 104, individual internal users 120, and/or one or more information sources 112. Examples of user behavior include when an internal user 120 logs in to work, where the internal user 120 logs in from; the specific websites and types of websites that internal user 120 visits, and with what frequency; the directories that internal user 120 accesses, along with typical read and write patterns; and so on.

The analytics 206 (such as machine learning analytics) may be used to detect anomalous or unusual user behavior. Engine 208 is able to correlate such anomalous or unusual behavior with user data 202, particularly with user data 202 that may indicate a heightened risk profile, and to use such correlation when generating a threat score. For example, if an employee is in financial difficulty that may indicate a heightened threat risk; likewise, if an employee has suddenly started to visit suspicious websites or engage in unusual file transfer operations that are outside the employee's normal behavior, that may indicate a heightened threat risk. Engine 208 is able to detect a correlation if both of these things are true (i.e. an employee is in financial difficulty and also suddenly starts to visit suspicious websites or engage in unusual file transfer operations that are outside the employee's normal behavior). In that case, engine 208 may in some embodiments generate a threat score that is higher than it otherwise would be, due to the co-occurrence of the risky personal situation and the sudden suspicious behavior. For example, depending on the severity of the threat, a wide array of mitigating activity could be signaled, including but not limited to alerting IT security personnel, alerting management and/or a direct supervisor, temporarily suspending network access, temporarily suspending access to sensitive documents, and so on.

As noted above, analytics 206 analyzes user data 202 and user behavior 204 in part to detect anomalous or unusual user behavior. This may include rules-based analysis, machine learning, or a combination of these and possibly other techniques. The analytics 206 may be specifically tailored to an industry, a particular organization, and even to a role or specific employee within the organization. For example, what constitutes suspicious or risky behavior will differ between an accountant and an IT specialist, and likewise may differ between even similarly situated employees in different industries (e.g., financial services, media, construction, energy, healthcare) or even in different organizations within the same industry. For instance, one organization may have a strict policy about what websites employees can visit (e.g., only work related, no social media), while another organization may have a looser policy (some social media is ok). An employee's role is also important to consider in tailoring analytics 206. Even if an organization has a strict no-social-media policy, that policy may not apply or may apply differently to certain employees in the advertising department who may need to use social media for job-related functions.

As an example of rules-based analysis, one rule may be that if a user accesses any site in the current week 20% more than in the prior week, the user's threat score should be increased. Another rule may be that if a user has a negative review or internal job change, the user's threat score should be increased. Another rule may be that if a user accesses the network from an unregistered device or from a strange location (e.g., in another state or out of the country when no work-related need to do so), the user's threat score should be increased. Another rule may be that if anomalous behavior of any sort is detected (e.g., measured as a percentage change from baseline for some measured quantity, such as daily network traffic, file system accesses, amount of data copied), the user's threat score should be increased. Other rules may impact a score in a defined way based on the occurrence of an event, such as a user attempting to access sensitive files or data, a user uploading files or data to an unauthorized or non-company storage site (such as G-Suite (Google Drive), or other unauthorized cloud storage platforms), a user accessing a company network in unusual off-hours (e.g. where historically the user had network activity during normal business hours and one day that user's account started running NMAP or accessing data during late or early morning hours). Another rule may be that if a user is on a leave of absence and the user's account is disabled by policy, the firewall may detect any connection and authentication attempts by that user account and make adjustments to the user score and/or trigger notifications or alarms. Rules may take automated action (such as adjusting a threat score in a determined manner) based on detected conditions and/or may escalate to a team or individual for action. Such rules may be designed or tailored by the information security policy team to suit the organization's particular practices and expectations.

One benefit of machine learning techniques is that such analytics can readily detect behavior that does not fit within a normal pattern. The techniques are also able to be adapted, so that a changing employee's role, new internal procedures, or other changes can be learned and adopted as a new baseline.

As an example of machine-learning based analysis, such analysis may include detecting and responding to anomalous activity, e.g. based on detecting such anamolous activity in logs such as repeat network service requests (e.g., FTP, SSH, Telnet) by malicious actors or foreign IP addresses (e.g., foreign to the known network subnets by a client's information security team, or outside of business boundaries). Machine learning analysis may monitor, classify, and learn how to identify specific data patterns that are normal and specific data patterns that are unusual. Unusual patterns (such as unusual network traffic or login attempts) may be processed for further analysis. Such further analysis may include discarding false positives, and allowing positive results to move through the appropriate rules, workflows, and execution. For example, as discussed herein, detection of some unusual activity may trigger warnings or alerts to supervisors and other appropriate personnel, while other unusual activity may contribute to the determined threat score but not prompt an alert or warning on its own. Which activity prompts a warning or alert may be tailored to an organization's specific needs and the organization's expectations for its users.

Analytics 206 may generate component information which engine 208 uses to generate a threat score. For example, analytics 206 may generate a list of conditions that tend to increase a user's threat score and another list of conditions that tend to mitigate a user's threat score. Engine 208 may process this component information to generate a final threat score. Such processing may include applying weights to component sub-scores, such as sub-scores for each of category of information source that analytics 206 has access to, e.g. a human resources sub-score, a directory service sub-score, an asset management sub-score, an endpoint security sub-score, and a firewall sub-score. Engine 208 may also correlate information from one or more of these information sources to further generate the final threat score.

As an example, analytics 206 and engine 208 may work together to generate a score as follows. If an employee is terminated, increase the threat score by 20. If an employee record is not found, increase the threat score by 30. If a terminated employee has an active account, increase the threat score by 50. If a user's account is active, increase the threat score by 10. If a user has an account, increase the threat score by 5 for any such account, whether active or not. If a user's account has an active privilege, increase the threat score by 30. If a user's account has an inactive privilege, increase the threat score by 10. In some embodiments, a threat score may be capped, such as to a maximum value of 100. The particular value that a given rule will increase a score may be adjusted based on an organization, the maximum value may be adjusted based on the organization, and a threshold for determining whether a given threat score represents a high risk (or thresholds for determining a low risk or an intermediate risk) may also be based on the organization. These are examples of rules that may be used, and as noted, machine learning analysis, and analysis of whether a user is displaying anamolous or non-baseline behavior (such as with network traffic or login attempts, and so on) may also impact a threat score.

Threat assessment node 106 may also provide a user interface. Users of such a user interface may include certain high-level employees of an organization (e.g., CEO, CFO), certain human resources (HR) employees, and IT employees. The user interface may provide a role-based view, such that different employees see a different view, and have access to some or all of the information (e.g., a limited subset of the information) based on their role. Some employees of an organization would not have any need to access the user interface, and so would not have access to it in some embodiments. The user interface may include a user dashboard that provides a number of widgets which show metrics of use or interest to a user. For example, widgets may show the organization's threat score, individual threat scores, the top n threat scores for an adjustable value of n, how this information has changed over time, and so on. The user interface may also display for individual users the components of how their threat score has been generated, or if there was particularly suspicious behavior the user interface may flag that behavior for attention. If there is an alert, or if the threat assessment node 106 has taken other action such as temporarily suspending an account, the user interface may also indicate this information.

Users may utilize the information presented by the user interface to further refine analytics 206 and/or engine 208 such that the ultimate threat score generated for individual employees is better tailored to an organization and to specific roles or employees within the organization.

Figure 3:
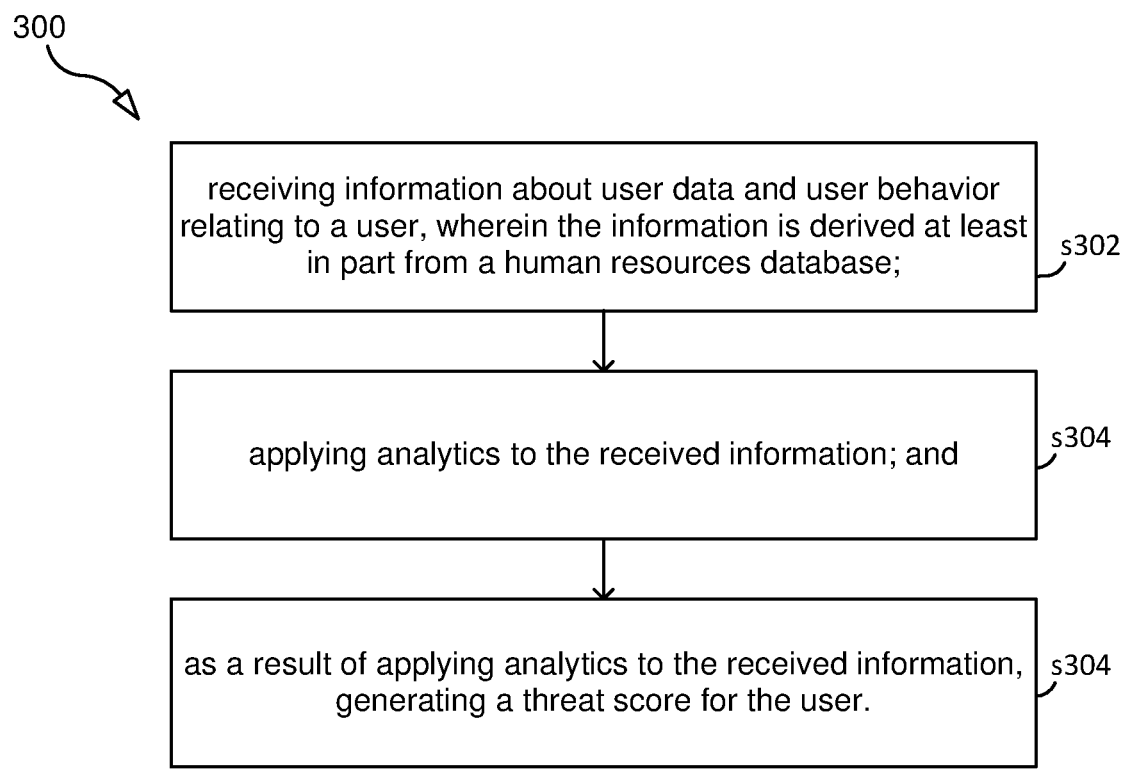
FIG. 3 illustrates a flow chart relating to one or more aspects of an insider threat management system according to an embodiment of the present invention.

FIG. 3 illustrates a flow chart according to an embodiment. Process 300 may begin with step s302.

Step s302 comprises receiving information about user data and user behavior relating to a user, wherein the information is derived at least in part from a human resources database.

Step s304 comprises applying analytics to the received information.

Step s306 comprises, as a result of applying analytics to the received information, generating a threat score for the user.

In some embodiments, the information is further derived at least in part from one or more of a directory service system, an asset management system, an endpoint security system, and a firewall system. In some embodiments, applying analytics comprises detecting that the user has deviated from a baseline behavior. In some embodiments, the method further includes detecting that the deviation from baseline behavior corresponds to an indicator from the human resources database indicating a life change event. In some embodiments, the method may further include taking a corrective action based on the threat score for the user, wherein the corrective action includes one or more of: publishing an alert, limiting privileges of the user, activating a monitoring agent to monitor the user, disabling network access for the user, and suspending an account of the user. In some embodiments, taking the corrective action is performed as a result of the threat score for the user exceeding a threshold.

Figure 4A:
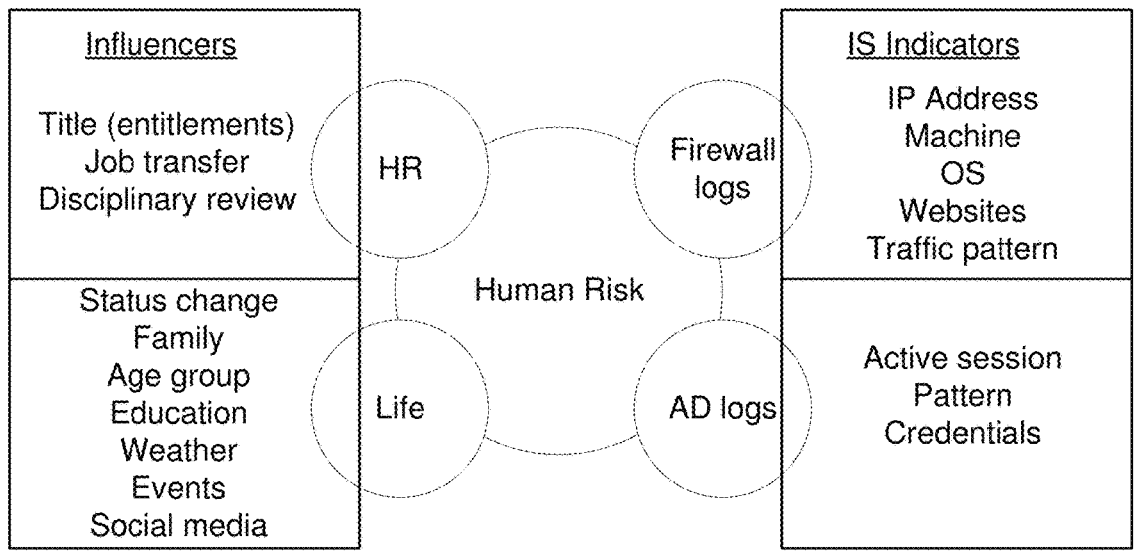
FIG. 4A illustrates a diagram showing factors affecting human risk relating to one or more aspects of an insider threat management system according to an embodiment of the present invention.

FIG. 4A illustrates a diagram showing factors affecting human risk according to an embodiment. As shown, "human risk" (such as that measured by the threat score of some embodiments) may be affected by a number of factors, such as human resources (HR), life, firewall logs, and/or AD logs. For instance, an employee's title (and corresponding job responsibilities), a recent job transfer, or a disciplinary review may all impact the risk that an employee poses for compromising IT security. Likewise, life events, such as a change in status, family, age group, education, weather, social media, and so on, may also impact the risk than an employee poses. Collectively, HR and life events may be referred to as "influencers," meaning that these things may influence an employee to behave in unusual or non-routine ways. Firewall logs may indicate an IP address of a computer logged into the system, the specific device and device characteristics (such as operating system) that is logged in, websites visited, traffic patterns, and so on. Similarly, AD logs may indicate an active session, patterns, credentials, and so on. Collectively, firewall and AD logs may be referred to as "IS indicators," (i.e. Information System indicators) meaning that these things may indicate that an employee has begun or may begin to engage in unusual or non-routine behavior. While a threat score may be determined from any one of these sources of information, it is beneficial to generate a threat score by taking into consideration multiple factors including influencers and indicators that can help to determine a more accurate assessment of risk.

Figure 4B:
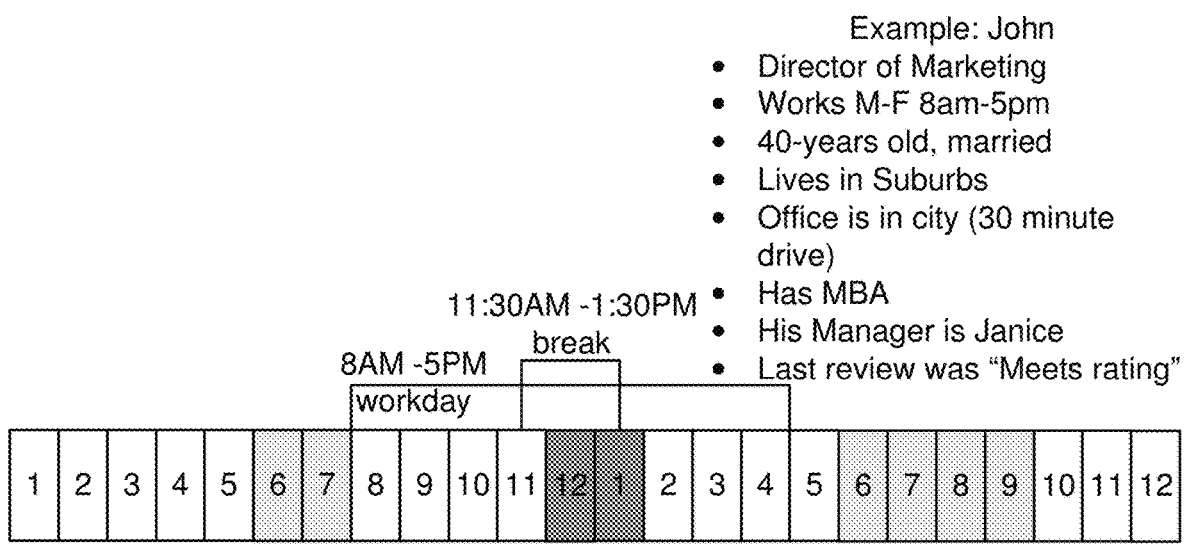
FIG. 4B illustrates an example profile relating to one or more aspects of an insider threat management system according to an embodiment of the present invention.

FIG. 4B illustrates an example profile according to an embodiment. As shown, an employee named John is the Director of Marketing. He typically works Monday through Friday from 8 am to 5 pm. He is 40-years old, married, lives in the suburbs, and commutes to his office in the city which is approximately a thirty-minute drive. John has an MBA, his manager is Janice, and his last employee review was "Meets rating" (or equivalently "average performance"). The timeline shown, which breaks out each hour of the day, indicates that John takes a break from 11:30 AM-1:30 PM each day of his typical 8-5 workday. Some periods during the day may present a higher risk, while others may be a lower risk. For example, John is a higher risk employee when he's active during work hours or working remotely. John's credentials could also pose a security risk while he is not at work because it the credentials may be intercepted, identified by a malicious actor, and used to gain access to a corporate network, system, or data. John could become a high-risk employee during work hours if he received a bad review and poor compensation/bonus, as this could influence his behavior and may lead him to attempt to exfiltrate data, download malicious programs, or become irresponsible with sensitive data. Studies have shown that employees may leave a company when they receive a bad review, fail to get an increased annual compensation or bonus, and that employees may violate personal conduct or information security policies in such circumstances. Therefore, threat assessment node 106 may increase a threat score associated with a user when one or more of these events occurs.

FIG. 5 illustrates an example risk calculation according to an embodiment. Here, a component score (and corresponding confidence measure) is assigned to different portions of an employee's day, or based on events or activities by the employee. For example, while the employee is at home from about 12 am-4 am, the risk is very low, and a component score of 10 is assigned with about 99% confidence. Likewise, during the employee's commute from about 4 am-8 am, the risk is very low, and a component score of 10 is assigned. Here, however, the confidence is only 30%. Sleep studies have shown that stressed employees sleep less. As that sleep window expires, the risk an employee poses (and correspondingly the threat score determined for the employee) may increase, e.g. because the probability of the employee checking email, logging on to the network, and so on is much more probable. During the employee's work time, from about 8 am-12 pm and 1 pm-5 pm (not including his lunch hour), the risk score is higher, rated at 50 with a 99% confidence. This is based on a complete evaluation of the employee, including the factors discussed elsewhere, and also includes the fact that the employee has a greater chance to either intentionally or unintentionally compromise IT security during this period since he is using the IT system more heavily during his work time. During the employee's lunch, from about 12 pm-1 pm, and his personal time after work, from about 5 pm-6 pm, the risk is very low, and is rated at 25 with a 50% confidence. Later, when the employee is off work (labeled "Life"), from about 6 pm-12 am, the risk is rated at 10 with a confidence of 99%. Other component scores are also assigned to categories such as HR (e.g. based on an evaluation of "does not meet," "meets," or "exceeds expectations"), firewall (e.g. based on deviation from baseline behavior), AD (e.g., based on whether there is an active session and/or whether the number of active sessions matches the number of devices registered to the user). Other categories are also possible, which are shown as "?" in FIG. 5.

Based on each of the component scores and their corresponding confidences, a threat score can be computed for the employee. For example, taking the example of FIG. 5, a threat score of 21.6 with a 71% confidence is computed. This represents a low risk employee. Based on preliminary results, embodiments disclosed herein are capable of predicting user behavior with about 71% confidence. For example, if threat assessment node 106 detects that John (the example user from above) likes to order pizza online through GrubHub or his smartphone every Friday for the last 10 weeks, it is highly probable that he will continue to order Pizza on the 11th week (that is, the next week). A deviation from this behavior increases the risk score (slightly here, but in other examples of deviation the increase could be greater) because the user has changed their typical behavior. By providing information about a threat score, such as a confidence and/or a margin of error expected for the score, changes in a threat score (such as a minor increase in the score) can be better understood and explained.

FIGS. 6A-6D illustrate state diagrams according to an embodiment. These state diagrams show, for instance, how different factors may influence an employee, and in turn can affect a threat score associated with the employee.

Figure 6A:
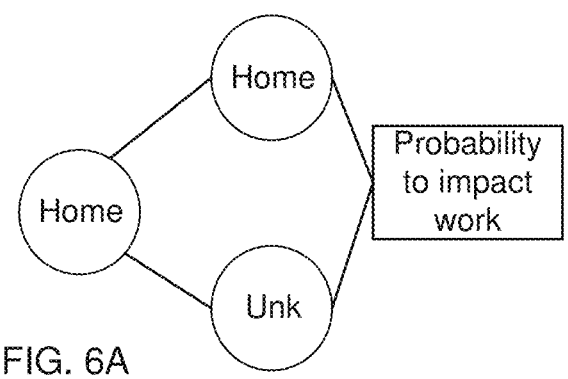
FIGS. 6A-6D illustrate state diagrams relating to one or more aspects of an insider threat management system according to an embodiment of the present invention.

In FIG. 6A, there are three nodes, labeled "Home," "Home," and "Unk" (i.e. "Unknown") together with a terminal node "Probability to impact work." For example, while at home, an employee may switch between staying at home and traveling to some unknown destination. Depending on which path the employee takes, this may affect the risk associated with the employee differently. For example, an employee working remotely (e.g., from a Starbucks or some other cafe offering free WiFi) where their network could be compromised by another malicious user may increase the risk posed by the employee, and such increased risk should be reflected in the threat score determined for that employee.

Figure 6B:
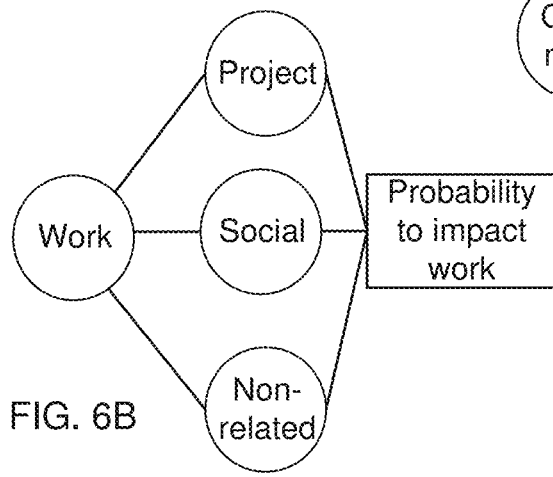

In FIG. 6B, there are four nodes, labeled "Work," "Project," "Social," and "Non-related," together with a terminal node "Probability to impact work." For example, while at work, an employee may switch between working on a project, socializing with other employees, or performing activities unrelated to work. Depending on which path the employee takes, this may affect the risk associated with the employee differently. For example, an employee socializing with other employees may be a lower risk, while an employee doing activity unrelated to work may be at a higher risk e.g. of accidentally downloading viruses or other malware. Typically, the longer an employee is on their workstation the probability increases that the employee will make a mistake or do something they should not do that may cause a compromise of IT security.

Figure 6D:
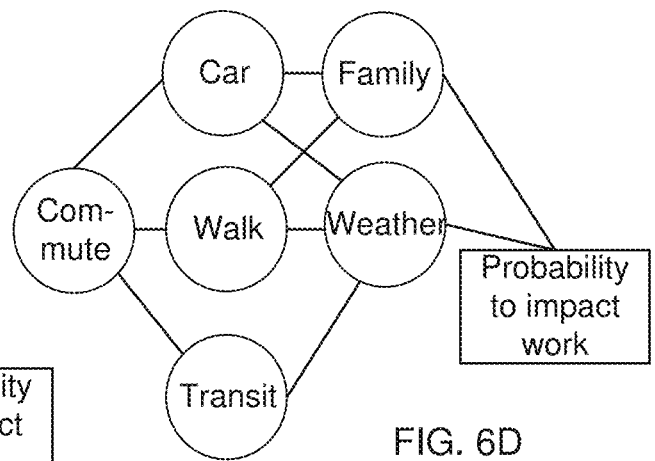
Figure 6C:
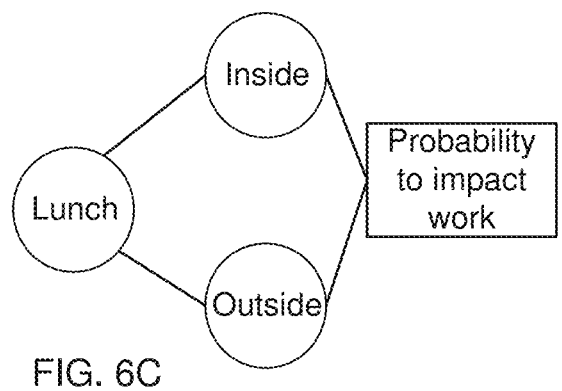

In FIG. 6C, there are three nodes, labeled "Lunch," "Inside," and "Outside" together with a terminal node "Probability to impact work." For example, while an employee is on a lunch break, the employee may decide to be inside or outside. Depending on which path the employee takes, this may affect the risk associated with the employee differently. For example, some employees prefer to surf the internet, check personal email, or work on some personal items on their computer or smartphone while having lunch at their desk. This raises the probability of IT security being compromised, e.g. that someone can maliciously or accidentally compromise IT security.

In FIG. 6D, there are six nodes, labeled "Commute," "Car," "Walk," "Transit," "Family," and "Weather," together with a terminal node "Probability to impact work." For example, while commuting to work, an employee may decide to take a car, walk, or take public transportation. While doing any of these options, weather may impact the employee, perhaps differently depending on whether the employee is driving, walking, or taking public transportation. Likewise, an employee may interact with family, such as by driving a family member to a different location and dropping the family member off, or walking with a family member such as dropping a child off at a neighborhood school before arriving at work. Depending on which path the employee takes, this may affect the risk associated with the employee differently. For example, if an employee is driving to work, the employee could be stuck in inclement weather or traffic and unable to make a client meeting or deadline to a critical project and at the same time the individual is not connected to the network during that time so their risk is lower (and the corresponding threat score can be lowered) because there is little to no chance for the employee to click on phishing emails, or download a virus. Likewise, similar events may impact a threat score when the employee is walking or taking transit. For example, an employee may routinely use a smartphone or laptop to access a corporate network while on a subway, which may increase the employee's risk and corresponding threat score.

Figure 7:
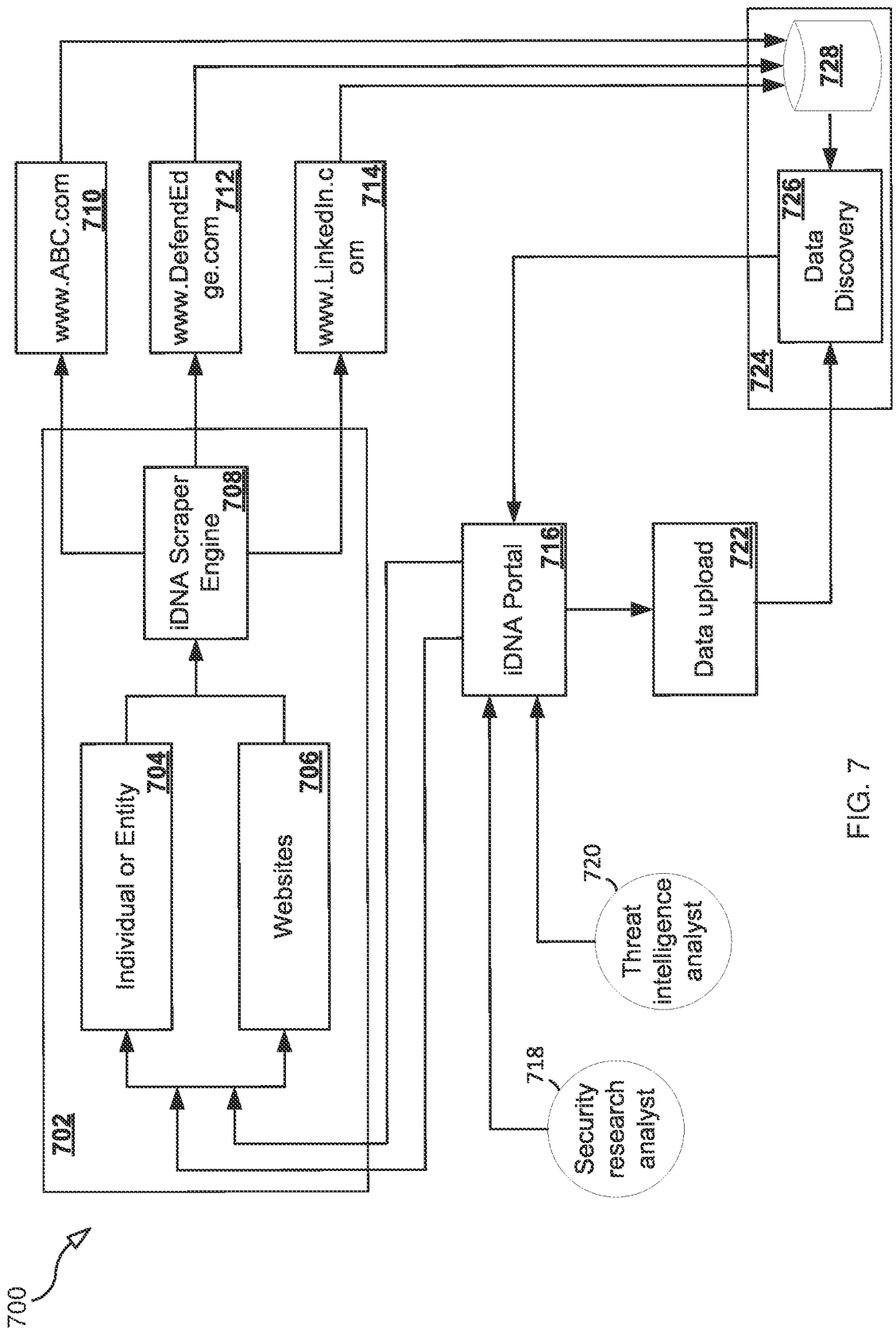
FIG. 7 illustrates a system relating to one or more aspects of an insider threat management system according to an embodiment of the present invention.

FIG. 7 illustrates a system 700 according to an embodiment. System 700 includes a web scraper engine 708, which can take as inputs an individual or entity module 704 and a websites module 706. The individual or entity module 704 may identify one or more individuals or entities to target, and the websites module 706 may indicate one or more websites to scan, may indicate one or more web sites as locations to start a crawl for scanning the web, and/or may indicate one or more websites not to scan. The websites module 706 may provide information about dark web or deep web locations to search. The modules 704 and 706 and the web scraper engine 708 form a data input unit 702. As illustrated, the websites module 706 may begin scanning a number of websites (e.g., www.ABC.com, wwww.DefendEdge.com, www.LinkedIn.com, shown as 710, 712, and 714 respectively). Information from this scanning process may be captured and stored at data store 728. The stored data at data store 728 may be provided to data discovery module 726, e.g. as raw data and/or as processed data after running one or more analyses. The data in the data discovery module 726 is available to the iDNA portal 716 which may provide a user interface, e.g. such as the user interface described above with respect to threat assessment node 106. The portal 716 may also receive information from one or more of a security research analyst 718 and a threat intelligence analyst 720. These analysts 718 and 720 may include manual input from human observers, or may include analysis from machine learning algorithms or other computerized assessments. The portal 716 may store this information that it receives in the data discovery module 726, e.g. as raw data and/r as processed data after running one or more analyses. The portal 716 may utilize data upload module 722 to do store the data in data discovery module 726. Data discovery module 726 and data store 728 form a data analysis module 724.

Figure 8:
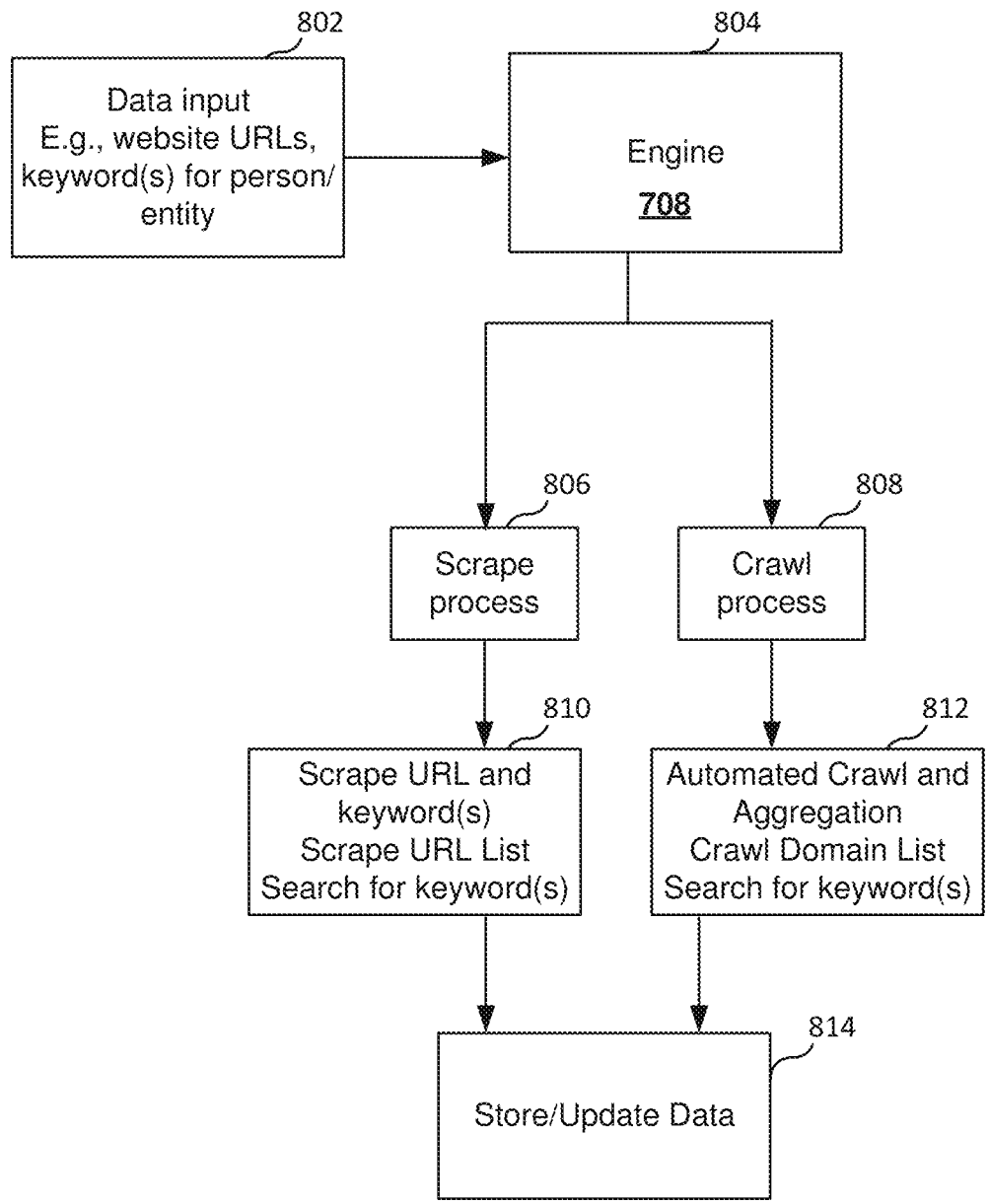
FIG. 8 illustrates a web scraper engine process relating to one or more aspects of an insider threat management system according to an embodiment of the present invention.

FIG. 8 illustrates a web scraper engine process. Engine 708 may receive as inputs one or more website URLs and one or more keywords related to a person or entity being targeted (at 802, 804). The website URLs may include information about the deep web or dark web. The engine 708 may determine to initiate a scraping process (at 806, 810) and/or a crawling process (at 808, 812). The scraping process will search each URL of the one or more URLs for the one or more keywords. The crawling process will also do that, but will additionally search URLs that are reachable from each of the one or more URLs. In some embodiments, the crawling process may be limited, e.g. to a subdomain (that is, it may process URLs reachable from a given URL that belong to a common subdomain), or otherwise, such as by a maximum number of URLs to analyze. In some embodiments, if a crawling process was not initiated, a crawling process may be initiated based on the results of the scraping process. For example, if the scraping process results in a given URL matching a number of the keywords, then engine 708 may determine to initiate a crawling process to analyze additional URLs reachable from the URL that matched the number of the keywords. One or more of the scraping process and crawling process may be executed at a fixed time, and also may be executed automatically at one or more scheduled times and/or based on a trigger. Following the scraping or crawling processes, the resulting data may be stored (at 814). If the data has previously been stored, in some embodiments the previously stored data is updated. For example, records may be kept as to whether a given URL has matched a given keyword at different times. Because websites change, in embodiments time information is stored with the collected data for further processing.

Threat assessment node 106 may be implemented in software and/or on computer hardware, and may in some embodiments have some or all of its processing instructions contained in a cloud environment. For example, each system or sub-system may be run on a cloud (e.g., AWS, Azure, Google). Threat assessment as described in embodiments may be offered as a service in a virtual environment, and clients may individually access a customized portal e.g. to apply customizations based on individual needs. Threat assessment node 106 may include processing circuitry (PC), which may include one or more processors (e.g., a general purpose microprocessor and/or one or more other processors, such as an application specific integrated circuit (ASIC), field-programmable gate arrays (FPGAs), and the like); a network interface comprising a transmitter (Tx) and a receiver (Rx) for enabling the apparatus to transmit data to and receive data from other nodes connected to a network (e.g., an Internet Protocol (IP) network) to which network interface is connected; and a local storage unit (a.k.a., "data storage system"), which may include one or more non-volatile storage devices and/or one or more volatile storage devices. In embodiments where PC includes a programmable processor, a computer program product (CPP) may be provided. The CPP includes a computer readable medium (CRM) storing a computer program (CP) comprising computer readable instructions (CRI). The CRM may be a non-transitory computer readable medium, such as, magnetic media (e.g., a hard disk), optical media, memory devices (e.g., random access memory, flash memory), and the like. In some embodiments, the CRI of the computer program is configured such that when executed by PC, the CRI causes threat assessment node 106 to perform steps described herein (e.g., steps described herein with reference to the flow charts such as FIG. 3). In other embodiments, the apparatus may be configured to perform steps described herein without the need for code. That is, for example, PC may consist merely of one or more ASICs. Hence, the features of the embodiments described herein may be implemented in hardware and/or software.

While the subject matter of this disclosure has been described herein with reference to certain illustrative aspects, including various combinations and sub-combinations of features, those skilled in the art will readily appreciate other aspects and variations and modifications thereof as encompassed within the scope of the present disclosure. Moreover, the descriptions of such aspects, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method comprising:
receiving information about user data and user behavior relating to a user, wherein the information is derived at least in part from a human resources database;
applying analytics to the received information;
as a result of applying analytics to the received information, generating a threat score for the user; and
taking a corrective action based on the threat score for the user, wherein the corrective action includes one or more of: publishing an alert, limiting privileges of the user, activating a monitoring agent to monitor the user, disabling network access for the user, and suspending an account of the user,
wherein receiving information about user data and user behavior relating to a user comprises receiving electronic information in a first format and translating the electronic information into a second format,
wherein applying analytics to the received information comprises applying both rules-based analytics and machine-learning analytics to the received information as translated into the second format,
wherein the rules-based analytics comprises rules for (1) increasing the threat score based on accessing a website by more than a first threshold amount in a current time period as compared to a previous time period, (2) increasing the threat score based on a poor performance review and/or internal demotion, (3) increasing the threat score based on accessing a network from an unknown location, (4) increasing the threat score based on accessing sensitive files, and (5) increasing the threat score based on uploading files to a unauthorized storage location, and
wherein the machine-learning analytics comprises detecting anomalous activity in network logs.

2. The method of claim 1, wherein the information is further derived at least in part from one or more of a directory service system, an asset management system, an endpoint security system, and a firewall system.

3. The method of claim 1, wherein applying analytics comprises detecting that the user has deviated from a baseline behavior.

4. The method of claim 3, further comprising detecting that the deviation from baseline behavior corresponds to an indicator from the human resources database indicating a life change event.

5. The method of claim 1, wherein taking the corrective action is performed as a result of the threat score for the user exceeding a threshold.

6. The method of claim 1, wherein the information is further derived at least in part from crawling a network including one or more of the Deep Web and the Dark Web.

7. A system comprising:
a memory; and
a processor, wherein said processor is configured to:
receive information about user data and user behavior relating to a user, wherein the information is derived at least in part from a human resources database;
apply analytics to the received information;
as a result of applying analytics to the received information, generating a threat score for the user; and
take a corrective action based on the threat score for the user, wherein the corrective action includes one or more of: publishing an alert, limiting privileges of the user, activating a monitoring agent to monitor the user, disabling network access for the user, and suspending an account of the user;
wherein receiving information about user data and user behavior relating to a user comprises receiving electronic information in a first format and translating the electronic information into a second format, wherein applying analytics to the received information comprises applying both rules-based analytics and machine-learning analytics to the received information as translated into the second format,
wherein the rules-based analytics comprises rules for (1) increasing the threat score based on accessing a website by more than a first threshold amount in a current time period as compared to a previous time period, (2) increasing the threat score based on a poor performance review and/or internal demotion, (3) increasing the threat score based on accessing a network from an unknown location, (4) increasing the threat score based on accessing sensitive files, and (5) increasing the threat score based on uploading files to a unauthorized storage location, and wherein the machine-learning analytics comprises detecting anomalous activity in network logs.

8. The system of claim 7, wherein the information is further derived at least in part from one or more of a directory service system, an asset management system, an endpoint security system, and a firewall system.

9. The system of claim 7, wherein applying analytics comprises detecting that the user has deviated from a baseline behavior.

10. The system of claim 9, wherein the processor is further configured to detect that the deviation from baseline behavior corresponds to an indicator from the human resources database indicating a life change event.

11. The system of claim 7, wherein taking the corrective action is performed as a result of the threat score for the user exceeding a threshold.

12. The system of claim 7, wherein the information is further derived at least in part from crawling a network including one or more of the Deep Web and the Dark Web.

13. A non-transitory computer readable medium computer program comprising instructions which when executed by processing circuitry causes the processing circuitry to perform the method of claim 1.

* * * * *